(12) United States Patent
Miller et al.

(10) Patent No.: US 7,671,481 B2
(45) Date of Patent: Mar. 2, 2010

(54) METHODS AND SYSTEMS FOR GENERATING ELECTRICAL POWER

(75) Inventors: Nicholas Wright Miller, Delmar, NY (US); Kara Clark, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/150,612

(22) Filed: Jun. 10, 2005

(65) Prior Publication Data

US 2006/0279088 A1    Dec. 14, 2006

(51) Int. Cl.
*F03D 9/00* (2006.01)
*H02P 9/04* (2006.01)

(52) U.S. Cl. .......................................... 290/44; 290/55
(58) Field of Classification Search .................. 290/55, 290/54, 43, 44; 415/7, 2.1, 907, 908, 4.3
See application file for complete search history.

(56) References Cited

U.S. PATENT DOCUMENTS

| 2,180,206 | A | * | 11/1939 | Honnef | 290/4 C |
| 2,329,675 | A | * | 9/1943 | Albers | 290/4 R |
| 4,150,300 | A | * | 4/1979 | Van Winkle | 290/2 |
| 4,186,312 | A | * | 1/1980 | Dvorak | 290/4 R |
| 4,206,608 | A | * | 6/1980 | Bell | 60/698 |
| 4,648,801 | A | | 3/1987 | Wilson | |
| 4,779,006 | A | * | 10/1988 | Wortham | 290/55 |
| 5,289,041 | A | * | 2/1994 | Holley | 290/44 |
| 5,592,028 | A | * | 1/1997 | Pritchard | 290/55 |
| 6,127,739 | A | | 10/2000 | Appa | |
| 6,492,743 | B1 | | 12/2002 | Appa | |
| 6,505,785 | B2 | * | 1/2003 | Willis et al. | 290/55 |
| 6,512,966 | B2 | | 1/2003 | Lof et al. | |
| 6,671,585 | B2 | | 12/2003 | Lof et al. | |
| 2004/0135375 | A1 | * | 7/2004 | Wobben | 290/44 |
| 2005/0200133 | A1 | * | 9/2005 | Wobben | 290/55 |
| 2005/0225090 | A1 | * | 10/2005 | Wobben | 290/44 |
| 2005/0225091 | A1 | * | 10/2005 | Enis et al. | 290/44 |
| 2005/0275225 | A1 | * | 12/2005 | Bertolotti | 290/44 |
| 2006/0033338 | A1 | * | 2/2006 | Wilson | 290/44 |
| 2006/0055175 | A1 | * | 3/2006 | Grinblat | 290/54 |

FOREIGN PATENT DOCUMENTS

| GB | 2190554 A | * | 11/1987 |
| JP | 60060279 A | * | 4/1985 |

* cited by examiner

*Primary Examiner*—Julio Gonzalez
(74) *Attorney, Agent, or Firm*—James McGinness, Esq.; Armstrong Teasdale LLP

(57) ABSTRACT

A power generation system including a wind turbine generator for generating electrical power, an alternate power source, and a processor programmed to control operation of the alternate power source to control a power output of the alternate power source at least partially based on at least one of a wind parameter, a wind forecast, a wind turbine condition sensor, and a power output of the electrical generator.

26 Claims, 7 Drawing Sheets

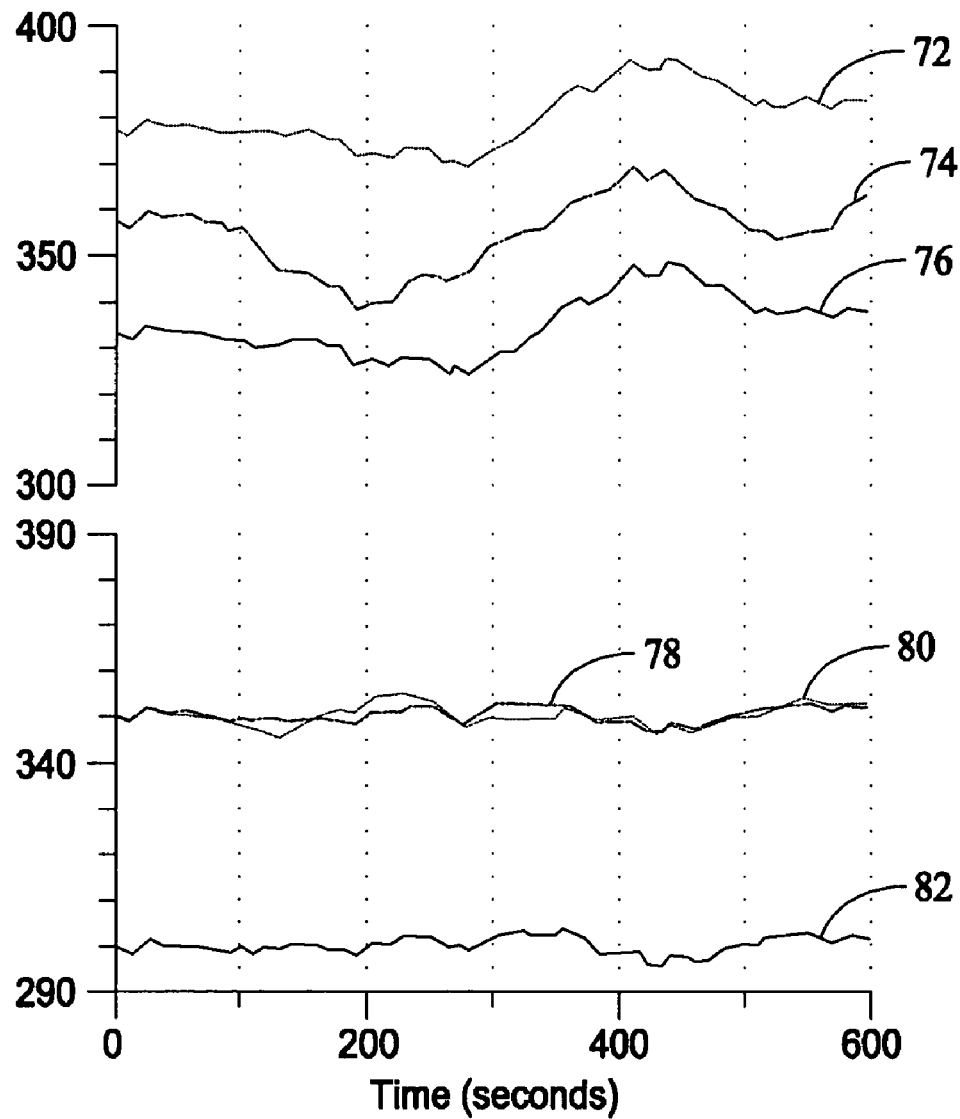

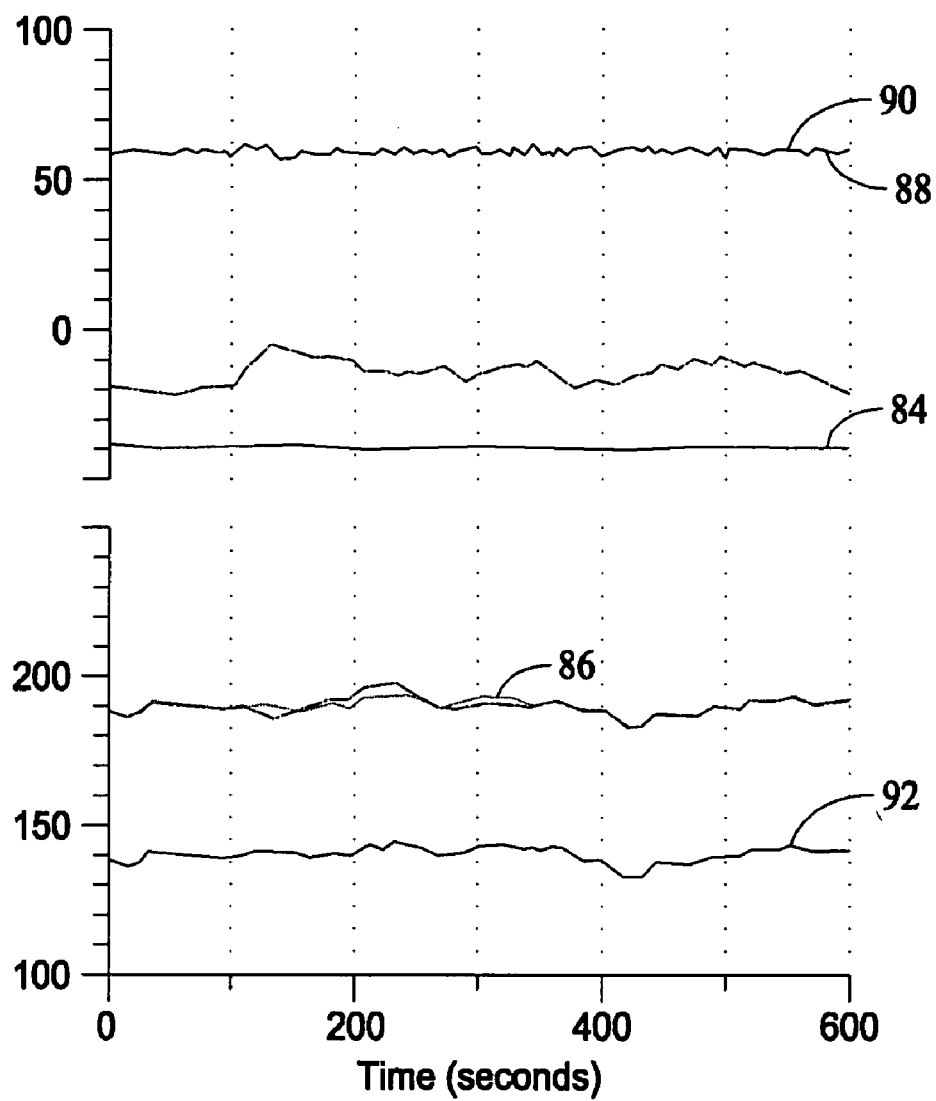

METHODS AND SYSTEMS FOR GENERATING ELECTRICAL POWER

BACKGROUND OF THE INVENTION

The methods and systems described herein relate generally to generating electrical power, and more specifically to generating electrical power using wind energy.

Wind energy is often used to generate electrical power at power plants, often referred to as wind farms, using, for example, the rotation of large wind turbines to drive electrical generators. However, because wind speed and density changes over time, power output from the generators of a wind farm may also change over time, sometimes even falling to zero when wind speed drops below a minimum threshold. Variations in power output from such wind farms may cause variations not only in an amount of power flowing from the farm but also a frequency of a power system to which the electrical power is delivered for consumption thereof. A group of power systems, power plants, and associated infrastructure spread over a geographical area is sometimes referred to as a grid. A drop in power output from the wind farm can cause a deficiency in power delivered to a local area of a grid of which the wind farm is within, as well as power delivered to other areas of the grid. Typically, a power output of one or more other power plants within the grid is adjusted to compensate for a change in the power output from the wind farm. Accordingly, a size of the wind farm relative to a local demand for power, sometimes referred to as a load demand, relative to a load demand of other areas of the grid, and/or relative to an overall load demand of the grid may influence an impact of the variable power output of the wind farm on other plants in the grid. For example, when power output from the wind farm falls to zero due to low wind, another plant within the grid may meet the total load demand of a region of the grid local to the wind farm. Such other power plants are typically plants that generate electrical power from coal, steam, a combustible fluid, water, and/or solar energy but may also include, but are not limited to, gas turbine power stations, nuclear power plants, or even other wind farms.

BRIEF DESCRIPTION OF THE INVENTION

In one aspect, a power generation system includes a wind turbine generator for generating electrical power, an alternate power source, and a processor programmed to control operation of the alternate power source to control a power output of the alternate power source at least partially based on at least one of a wind parameter, a wind forecast, a wind turbine condition sensor and a power output of the electrical generator.

In another aspect, a method is provided of generating electrical power. The method includes generating electrical power using a wind farm, generating electrical power using an alternate power source, and controlling operation of the alternate power source to control a power output of the alternate power source at least partially based on at least one of a wind parameter, a wind forecast, a wind turbine condition sensor, and a power output of the wind farm.

In even another aspect, a processor for controlling operation of a power generation system including a wind farm and an alternate power source is programmed to control operation of the alternate power source to control a power output of the alternate power source at least partially based on at least one of a wind parameter, a wind forecast, a wind turbine condition sensor, and a power output of the wind farm.

BRIEF DESCRIPTION OF THE DRAWINGS

FIG. 7 is a graph illustrating an exemplary embodiment of a power output over time of one of the power generation systems shown in FIG. 1.

FIG. 8 is a graph illustrating an exemplary embodiment of a power output over time of another power generation system shown in FIG. 1.

FIG. 9 is a graph illustrating an exemplary embodiment of the export of electrical power from the power generation system shown in FIG. 2.

FIG. 10 is a graph illustrating an exemplary embodiment of the exchange of electrical power between two of the power generation systems shown in FIG. 1.

Corresponding reference characters indicate corresponding parts throughout the several views of the drawings.

DETAILED DESCRIPTION OF THE INVENTION

Figure 1:
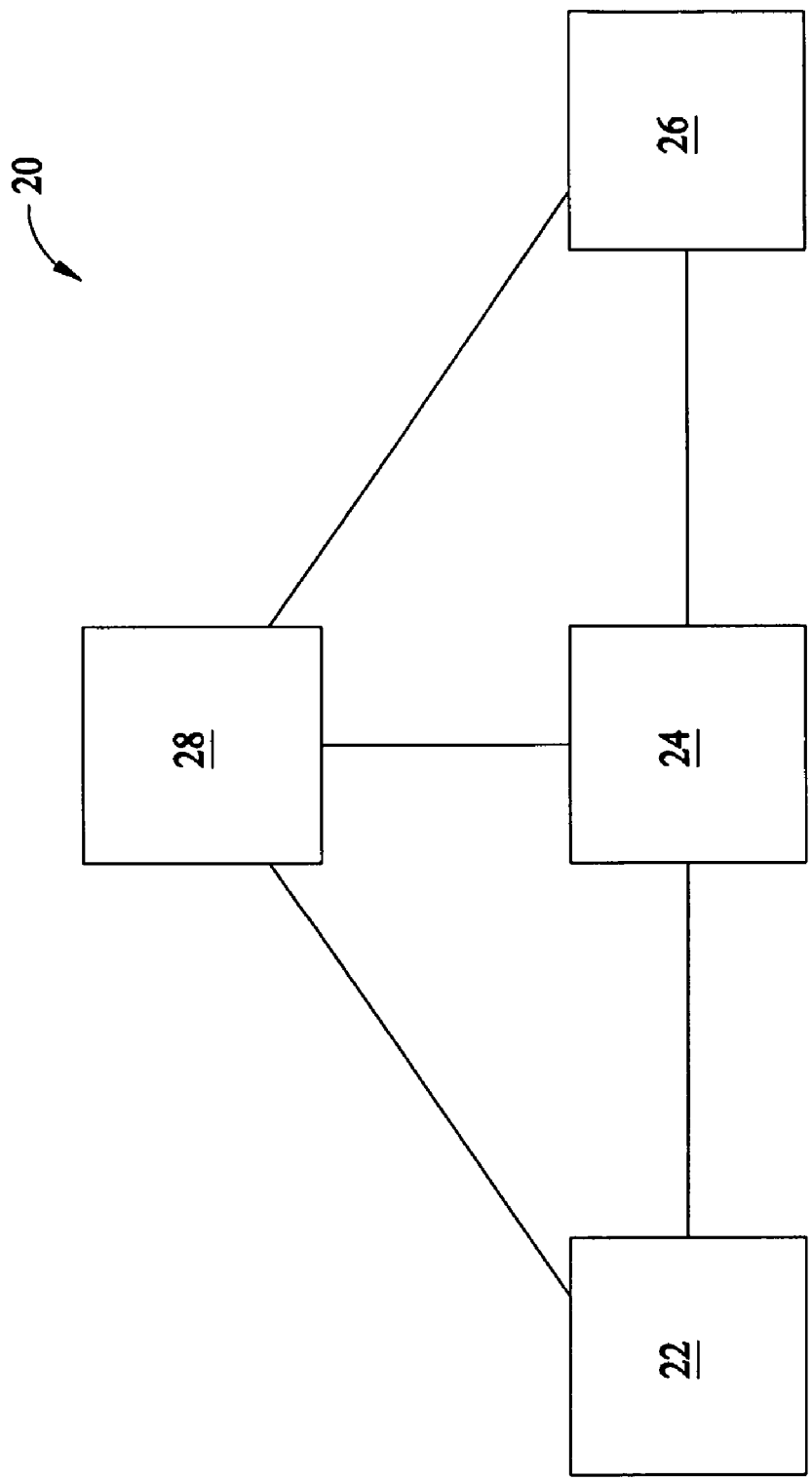
FIG. 1 is a schematic of an exemplary embodiment of a grid including a plurality of power generation systems.

Referring now to the drawings, and more specifically to FIG. 1, an exemplary embodiment of a grid is designated in its entirety by the reference numeral 20. The grid 20 includes a plurality of power generation systems 22, 24, and 26 and, in some embodiments, is spread over a geographic area. The grid 20 may also include systems (not shown) that consume power (sometimes referred to herein as "power systems") as well as infrastructure (not shown) of the grid 20, such as, but not limited to infrastructure for interconnection, control, maintenance, and/or improvement of the power generation systems 22, 24, and 26, the power systems, and/or any infrastructure of the grid 20. For example, in some embodiments the grid 20 includes electrical transmission lines (not shown) interconnecting power generation systems 22, 24, and/or 26, power systems within the grid 20, any infrastructure within the gird 20, and/or any combination thereof. Moreover, and for example, infrastructure may include infrastructure for controlling the generation and distribution of power within the grid 20, such as, but not limited to substations (not shown) that facilitate distribution of power within the grid 20 and/or the control systems 28 and 34 described below and illustrated in FIGS. 1 and 2, respectively. Although the grid 20 may include any number of power generation systems, for exemplary purposes the grid 20 includes the three power generation systems 22, 24, and 26. In the exemplary embodiment of FIG. 1, the grid 20 includes a centralized control system 28 operatively connected to the systems 22, 24, and 26 for controlling a power output of each of the power generation systems 22, 24, and/or 26 at least partially using, for example, processing logic. The control system 28 and/or portions thereof may be located at one of the power generation systems 22, 24, and/or 26. In some embodiments, the control system 28 and/or portions thereof are located remote from the power generation systems 22, 24, and/or 26. The power output of the power generation systems 22, 24, and 26 controlled by the centralized control system 28 may include, but is not limited to (whether described and/or illustrated herein), an amount of electrical power generated by the systems 22, 24, and/or 26, a frequency of electrical power generated by the systems 22, 24, and/or 26, and/or a rate of change of the amount and/or the frequency of electrical power generated by the systems 22, 24, and/or 26.

The power generation systems 22, 24, and 26 may, for example, each serve a geographic region (not shown) within the grid 20 by delivering electrical power to such regions. In some embodiments, at least a portion of the electrical power delivered to a corresponding region by a system of the systems 22, 24, and 26 may be generated by another system of the systems 22, 24, and 26. Although the power generation systems 22, 24, and 26 are shown in FIG. 1 as generally equally spaced apart, it should be understood that FIG. 1 is a schematic that is not a scale representation of the grid 20. Rather, each of the power generation systems 22, 24, and 26 may be spaced any distance from any other of the systems 22, 24, and 26. Similarly, the geographic regions each system 22, 24, and 26 serves may be spaced any distance from other geographic regions within the grid 20, although the geographic region served by a system 22, 24, and/or 26 need not be adjacent such system. In some embodiments, at least one of the geographic regions within the grid 20 overlaps another of the geographic regions within the grid 20. The power generation systems 22 and 24 may each include any type of power source. For example, in some embodiments the power generation system 22 and/or 24 may include a power source that generates electrical power at least partially from coal, steam, water, a combustible fluid (such as, but not limited to, whether described herein, gasoline, natural gas, diesel fuel, etc.), and/or solar energy. Additionally, in some embodiments, the power generation systems 22 and/or 24 include a nuclear power source, a gas turbine power station, and/or a wind farm.

Although the grid 20 may generate any total value of electrical power, in one exemplary embodiment the total value of electrical power generated by the systems 22, 24, and 26 is between about 500 and about 10,000 MW. Similarly, although each power generation system 22, 24, and 26 may generate any value of electrical power, in one embodiment the value of electrical power generated by each of the systems 22, 24, and 26 is between about 10 and about 4,000 MW.

Figure 2:
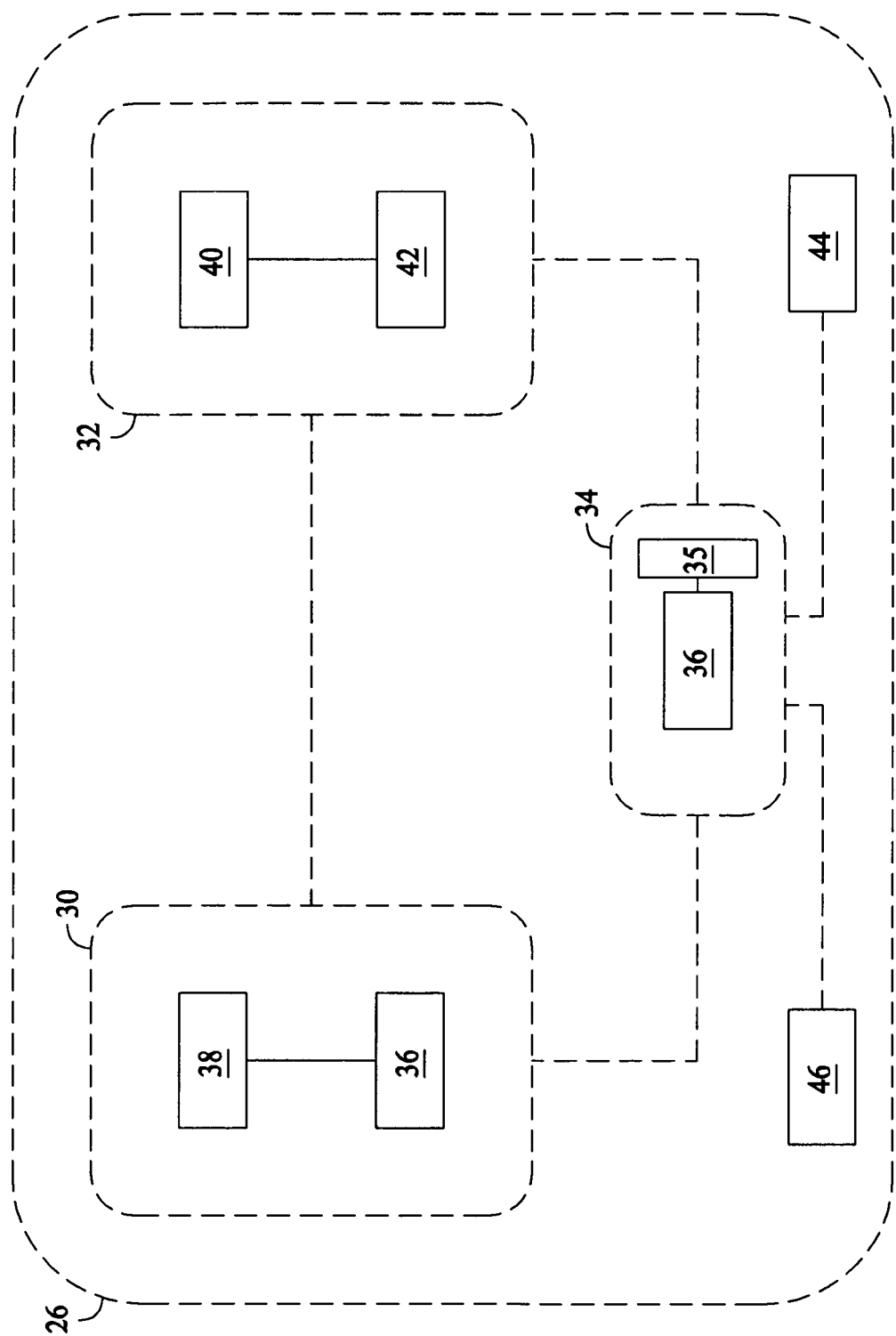
FIG. 2 is a schematic of an exemplary embodiment one of the power generation systems shown in FIG. 1.

As shown in FIG. 2, the power generation system 26 includes a wind farm 30 for generating electrical power from wind and at least one alternate power source 32 for generating electrical power. Although not shown in FIG. 2, as described above with respect to the power generation systems 22, 24, and 26 (systems 22 and 24 are shown in FIG. 1), each of the wind farm 30 and/or the alternate power source 32 may be operatively connected to each other, the systems 22 and/or 24, power systems (not shown) within the grid 20 (shown in FIG. 1), any infrastructure (not shown) within the grid 20, and/or any combination thereof, for example, but not limited to, using electricity transmission lines.

The power generation system 26 also includes a control system 34 operatively connected to the wind farm 30 and the alternate power source 32 for generally controlling operation of the wind farm 30 and/or the alternate power source 32. Specifically, the control system 34 includes a processor 36 for controlling a power output of the power generation system 26, including the wind farm 30 and/or the alternate power source 32. The control system 34 may also include other components, for example a component that facilitates executing any of the steps, processes, functions, and/or operations of the control system 34 described herein, such as, but not limited to, a database 35 operatively connected to the processor 36. As will be described in more detail below, the control system 34 may control a power output of any portion of the power generation system 26, such as, but not limited to, a power output delivered by the power generation system 26 to power systems within the grid 20, delivered by the system 26 to the systems 22 and/or 24, and/or delivered by the system 26 to any infrastructure of the grid 20. As will also be described below in more detail, the power output of the power generation system 26 controlled by the control system 34 may include an amount of electrical power generated by any portion of the system 26, a frequency of electrical power generated by any portion of the system 26, and/or a rate of change of the amount and/or the frequency of electrical power generated by any portion of the system 26. Additionally, the control system 34 may communicate with the centralized control system 28 (shown in FIG. 1) to perform any of the functions, processes, steps, and/or operations of the control system 34 described herein. The control system 34 and/or portions thereof may be located at the alternate power source 32 and/or the wind farm 30. In some embodiments, the control system 34 and/or portions thereof are located remote from the alternate power source 32 and/or the wind farm 30.

The wind farm 30 includes at least one wind turbine 36 for generating rotational energy from wind and at least one electrical generator 38 operatively connected to the wind turbine 36 for generating electrical power from the rotational energy generated by the wind turbine 36. The combination of a wind turbine 36 and an electrical generator 38 is sometimes referred to in the art, and may also be referred to herein, as a "wind turbine generator." The wind farm 30 may include any number of turbines 36 that each may or may not be located adjacent other turbines 36 of the wind farm 30, and/or may include any number of electrical generators 38 that each may or may not be located adjacent other generators 39 of the wind farm 30 and/or any turbines 36 of the wind farm 30. Wind farms are known in the art and accordingly the specific structure, functions, steps, processes, and/or operations of the wind farm 30 that operate to generate electrical power will not be described in more detail herein.

The alternate power source 32 may include any type of power source. For example, in some embodiments the alternate power source 32 may be a system that generates electrical power at least partially from coal, steam, water, a combustible fluid (such as, but not limited to, whether described herein, gasoline, natural gas, diesel fuel, etc.), and/or solar energy. Additionally, in some embodiments, the alternate power source 32 includes a nuclear power source, a gas turbine power station, and/or a wind farm. In some embodiments, at least a portion of the alternate power source 32 is mobile for at least partial transportation to or adjacent the wind farm 30, the power generation systems 22 and/or 24, power systems within the grid 20, geographic regions within the grid 20, and/or any infrastructure of the grid 20.

In some embodiments, the alternate power source 32 includes a gas turbine engine 40 for generating rotational energy from combustion gases. For example, in some embodiments the alternate power source 32 includes a simple-cycle gas turbine engine 40, such as, but not limited to, a General Electric LMS100™ engine commercially available from General Electric Company of Schenectady, N.Y. Of course, the alternate power source 32 is not limited to including a simple-cycle gas turbine engine 40, but may include other types of gas turbine engines 40 in addition to or in place of a simple-cycle gas turbine engine. Furthermore, the alternate power source 32 is not limited to including gas turbine engines 40 generally. In some embodiments wherein the alternate power source 32 includes the gas turbine engine 40, at least a portion of the engine 40 is mobile for at least partial transportation to or adjacent the wind farm 30, the power generation systems 22 and/or 24, geographic regions within the grid 20, and/or any infrastructure of the grid 20. When the alternate power source 32 includes a gas turbine engine 40, the alternate power source 32 may also include an electrical generator 42 operatively connected to the engine 40 for generating electrical power from the rotational energy generated by the gas turbine engine 40.

Figure 3:
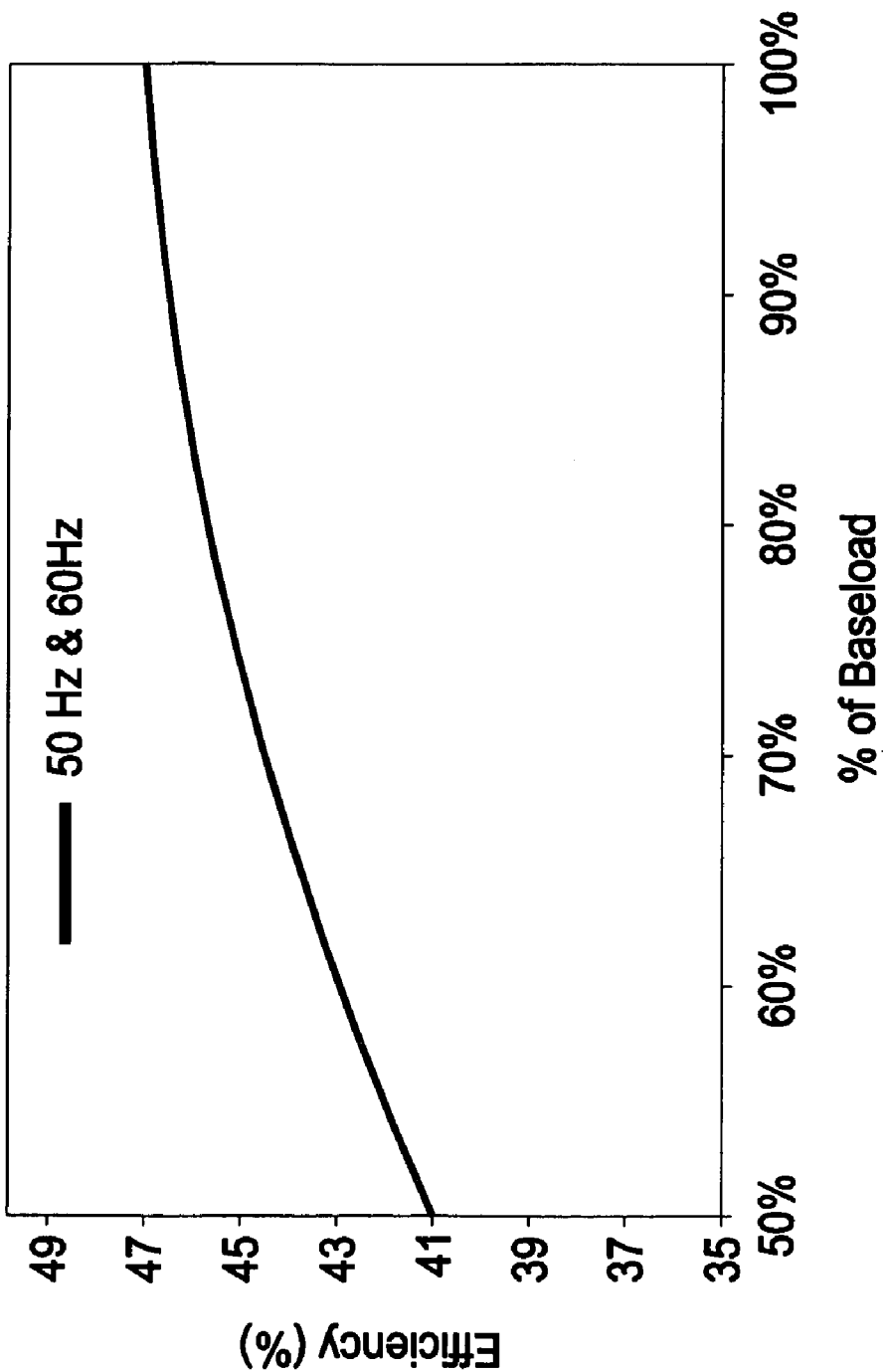
FIG. 3 is a graph illustrating an exemplary efficiency of an exemplary embodiment of a gas turbine engine for use with the power generation system shown in FIG. 2.

In some embodiments, the gas turbine engine 40 has an efficiency of equal to or greater than about 35 percent at an operational load of at least about 50 percent. Additionally, in some embodiments the gas turbine engine 40 does not emit sound greater than about 100 dBA at a distance of at least three feet during operation thereof. Furthermore, in some embodiments the gas turbine engine 40 includes a nominal rating of between about 50 and 150 MW. Moreover, in some embodiments the gas turbine engine 40 emits NOx at no more than about 35 parts per million during operation thereof. For example, FIG. 3 illustrates an exemplary efficiency of the gas turbine engine 40 over a range of operational loads thereof.

In some embodiments, the system 26 includes at least one sensor 44 operatively connected to the control system 34 for measuring a wind parameter, such as, but not limited to (whether described herein) a wind speed and/or a wind density. For example, in some embodiments, the sensor 44 is configured to measure wind speed and is operatively connected to the control system 34 for transmitting a measured wind speed to the control system 34. Additionally, in some embodiments, the sensor 44 is configured to measure wind density and is operatively connected to the control system 34 for transmitting a measured wind density to the control system 34. In some embodiments, the sensor 44 may be configured to measure both wind speed and wind density, and/or may be configured to measure other wind parameters. In some embodiments, the system includes at least one sensor 46 configured to measure an operating condition (including an indication of a change in any operating condition) of the wind farm 30 (including the turbine(s) 36, the generator(s) 38, and any infrastructure of the farm 30), of any infrastructure of the grid 20, and/or of the alternate power source 32. For example, in some embodiments, the sensor 46 is configured to measure an operational condition of the wind farm 30 that indicates a failure (or potential failure) of the turbine 36 and/or the generator 38. The sensors 44 and/or 46 may be located anywhere within the grid 20. For example, in some embodiments the sensors 44 and/or 46 are located at or adjacent a wind turbine 36 and/or an electrical generator 38 of the wind farm 30. Additionally, and for example, in some embodiments the sensors 44 and/or 46 are located at or adjacent the alternate power source 32 and/or the systems 22 and/or 24.

Figure 4:
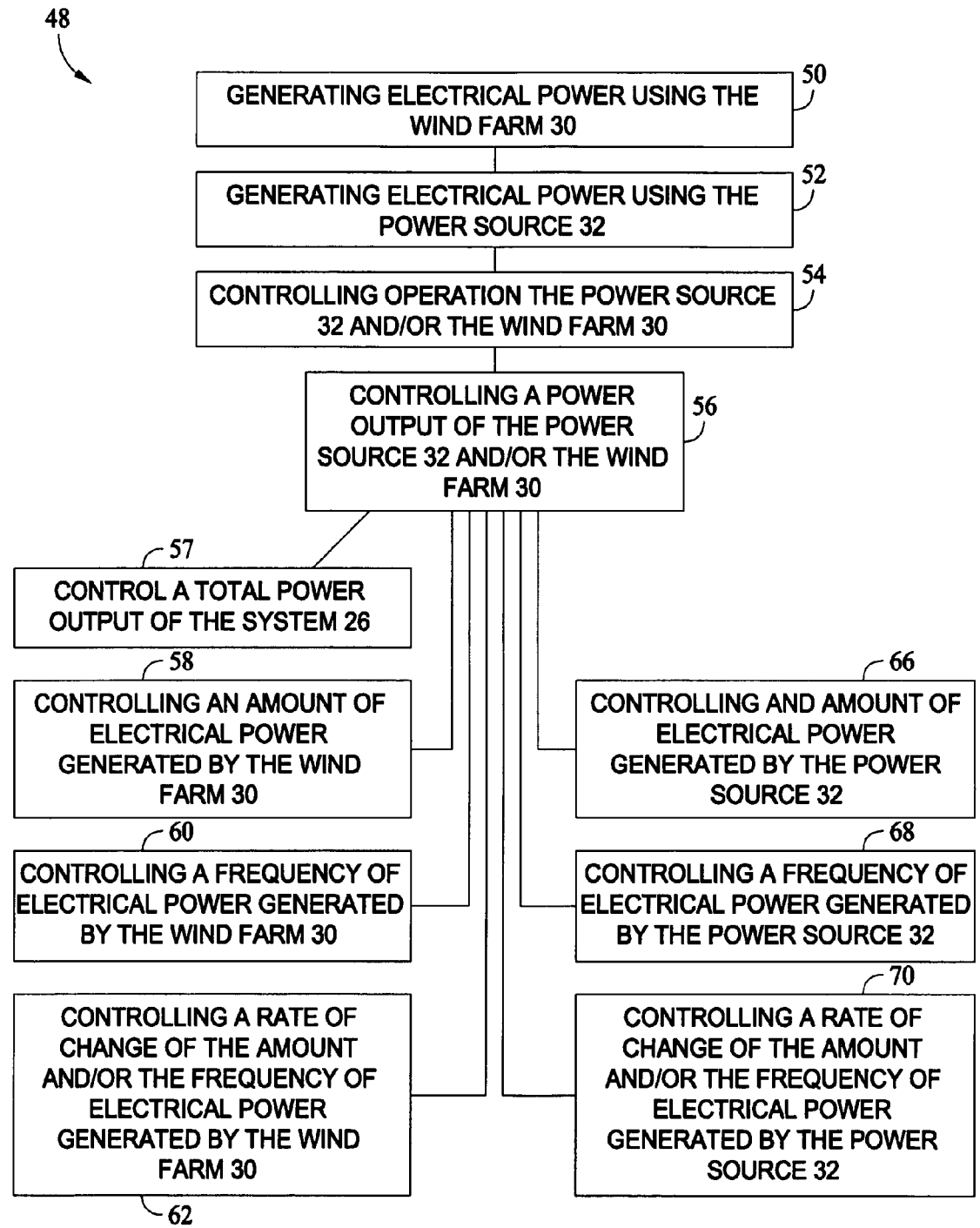
FIG. 4 is a flowchart illustrating an exemplary embodiment of a method for generating electrical power using the power generation system shown in FIG. 2.

As shown in FIG. 4, an exemplary embodiment of a method of generating electrical power using the power generation system 26 (shown in FIGS. 1 and 2) is designated in its entirety by 48. The method 48 generally includes generating 50 electrical power using the wind farm 30 and generating 52 electrical power using the alternate power source 32. As described above, the method 48 also includes controlling 54 operation of the alternate power source 32 and/or the wind farm 30 using the control system 34. For example, in some embodiments, the control system 34, including the processor 36, controls 56 (such as, but not limited to, changing or maintaining) a power output of the alternate power source 32 (and/or the wind farm 30), for example, to control 57 a total power output of the system 26. (A total power output includes all of the electrical power generated, stored, and/or exported by the system 26.) Control 56 of a power output of the wind farm 30 and/or the alternate power source 32 may include control of any characteristic (whether described herein) of electrical power. For example, in some embodiments, controlling 56 the power output of the wind farm 30 includes controlling 58 an amount of electrical power generated by the wind farm 30, controlling 60 a frequency of electrical power generated by the wind farm 30, and/or controlling 62 a rate of change of the frequency and/or the amount of electrical power generated by the wind farm 30 (e.g., a scheduled absolute maximum rate of change of power generation or a scheduled time average maximum rate of change). Similarly, in some embodiments, controlling 56 the power output of the alternate power source 32 includes controlling 66 an amount of electrical power generated by the alternate power source 32, controlling 68 a frequency of electrical power generated by the alternate power source 32, and/or controlling 70 a rate of change of the frequency and/or the amount of electrical power generated by the alternate power source 32 (e.g., a scheduled absolute maximum rate of change of power generation or a scheduled time average maximum rate of change). Of course, control 57 of a total power output may include control of any characteristic, whether described herein, of electrical power, such as amount, frequency, and/or rate of change.

The control system 34 may base control 56 of a power output of the wind farm 30 and/or the alternate power source 32 at least partially on a wind parameter (such as, but not limited to, whether described herein, a wind speed or a wind density), a wind forecast (e.g., obtained for example using a wind forecasting-algorithm), a wind turbine condition sensor (e.g., the sensor(s) 46 shown in FIG. 2), and a power output of the wind farm 30 and/or the alternate power source 32. Basing control 56 at least partially on a wind turbine condition sensor may include, but is not limited to (whether described herein), basing control 56 on an operational condition of the wind farm 30 (such as, but not limited to, whether described herein, an operational condition that indicates a failure, or a potential failure, of the wind farm 30 including any components thereof). Of course, and for example, control 56 may also be based at least partially on an operating condition of the alternate power source 32, any infrastructure of the grid 20, and/or the power generation systems 22 and/or 24. The wind speed and/or density may be detected using the sensor(s) 44 (shown in FIG. 2). In some embodiments, the wind parameter detected may be a wind parameter adjacent a portion of the wind farm 30, for example a wind turbine 36. In alternative or addition to the wind parameter adjacent the wind farm 30, a wind parameter remote from the wind farm 30 may be detected. The power output of the wind farm 30 and/or the alternate power source 32 that the control system 34 may base control 56 on may include an amount of electrical power generated by the wind farm 30 and/or the alternate power source 32, a frequency of electrical power generated by the wind farm 30 and/or the alternate power source 32, a rate of change of the amount and/or frequency of electrical power generated by the wind farm 30 and/or the alternate power source 32, and/or a potential amount of electrical power output of the wind farm 30 and/or the alternate power source 32. The potential amount of electrical power output of the wind farm 30 and/or the alternate power source 32 may be measured and/or calculated using, for example, ambient conditions adjacent the wind farm 30 and/or the alternate power source 32, and/or operational conditions of the wind farm 30 and/or the alternate power source 32. Similarly, the amount of electrical power output of the wind farm 30 and/or the alternate power source 32 may be measured and/or calculated using, for example, ambient conditions adjacent the wind farm 30 and/or the alternate power source 32, and/or operational conditions of the wind farm 30 and/or the alternate power source 32.

One example of control 56 includes controlling 56 a power output of the alternate power source 32 (and/or the wind farm 30) in response to a change (or indication of an upcoming and/or expected change) of a characteristic (including an operating condition), such as, but not limited to, a power output, of the wind farm 30 (and/or the alternate power source 32). Such a change of a characteristic of the wind farm 30 and/or the alternate power source 32 may, for example, be due to an operational condition of the wind farm 30 and/or the alternate power source 32, and/or may for example, be due to a change in a wind parameter, such as, but not limited to (whether described herein), wind speed and/or wind density, for example, adjacent a wind turbine 36 of the wind farm 30. For example, when a wind speed and/or density adjacent the wind turbine(s) 36 of the wind farm 30 reduces, it may reduce the rotational energy generated by the wind turbine 36 from the wind, thereby reducing an amount of electrical power generated by the electrical generator 38, and consequently the wind farm 30. However, and for example, in anticipation of or in response to a reduction of the amount of electrical power generated by the wind farm 30, the control system 34 can control operation of the alternate power source 32 to increase the amount of electrical power generated by the alternate power source 32 to compensate for the reduced amount of electrical power generated by the wind farm 30, and thereby control a total amount of power generated by the system 26. Similarly, and for example, in anticipation of or in response to a reduction of the amount of electrical power generated by the alternate power source 32, the control system 34 may control operation of the wind farm 30 to increase an amount of electrical power generated by the wind farm 30 to compensate for the reduced amount of electrical power generated by the alternate power source 32. Of course, and for example, the control system 34 may decrease an amount of electrical power generated by the wind farm 30 and/or the alternate power source 32 to compensate for a gain of an amount of electrical power generated by the wind farm 30 and/or the alternate power source 32.

Another example of controlling 56 a power output of the alternate power source 32 and/or the wind farm 30 includes, as described above, controlling 57 a total power output of the system 26, for example, but not limited to, changing a total amount of electrical power generated by the system 26, changing a frequency of the electrical power generated by the system 26, and/or changing a rate of change of the frequency and/or the amount of electrical power generated by the system 26. In some embodiments, the control system 34 may control 57 the total power output of the system 26 within a predetermined range (of a specific characteristic(s)), such as, but not limited to, predetermined ranges stored in the database (shown in FIG. 2) of the control system for a variety of operating conditions (including ambient conditions) of the system 26. In some embodiments, when an amount of electrical power generated by the wind farm 30 is generally about zero, the control system 34 controls 56 a power output of the alternate power source 32 to provide the total amount of power generated by the system 26 from the alternate power source 32. In some embodiments, the total amount of electrical power generated by the system 26 includes an electrical power load demand of a geographic region within the grid 20 served by the system 26, such that at least some of the electrical power generated by the system 26 is delivered to the geographic region served by the system 26. In some embodiments, during some operating conditions, all of the amount of electrical power generated by the system 26 is delivered to the geographic regions served by the system 26. Alternatively, in some embodiments all of the amount of electrical power generated by the system 26 does not include an electrical power demand of a geographic region within the grid 20 served by the system 26. Controlling 56 a power output of the wind farm 30 and/or the alternate power source 32 may also include, in some embodiments, facilitating minimizing fuel costs of the alternate power source 32 and/or operational costs of the system 26, including the wind farm 30 and/or the alternate power source 32.

Another example of controlling 56 a power output of the alternate power source 32 and/or the wind farm 30 includes controlling an amount of electrical power generated by the wind farm 30, for example by increasing it, in response to a change in frequency of the electrical power generated by the wind farm 30 and/or the alternate power source 32. For example, the control system 34 may generally maintain a particular frequency (such as, but not limited to, whether described herein, about 60 hz) by controlling the amount of electrical power generated by the wind farm 30 and/or the alternate power source 32.

As should be understood by one skilled in the art, commands sent from the control system 34 for controlling 56 a power output of the alternate power source 32 and/or the wind farm 30 may not always result in a corresponding power output of the alternate power source 32 and/or the wind farm 30. Accordingly, a feedback loop may be utilized by the control system 34 to calculate and correct for errors in, for example, a frequency of the electrical power generated by the wind farm 30 and/or the alternate power source 32, an amount of electrical power generated by the wind farm 30 and/or the alternate power source 32, and/or a rate of change of an amount and/or a frequency of electrical power generated by the wind farm 30 and/or the alternate power source 32.

Figure 5:
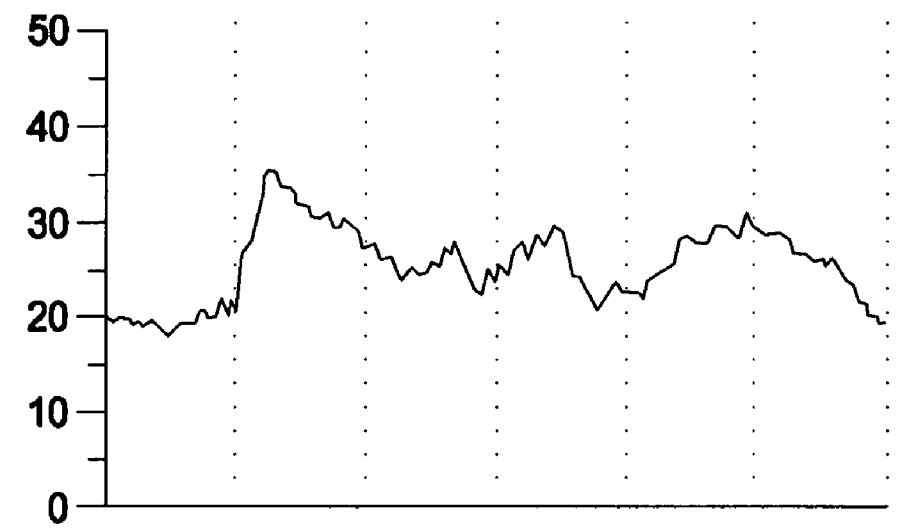
FIG. 5 is a graph illustrating an exemplary embodiment of a power output over time of an exemplary wind farm.
Figure 6:
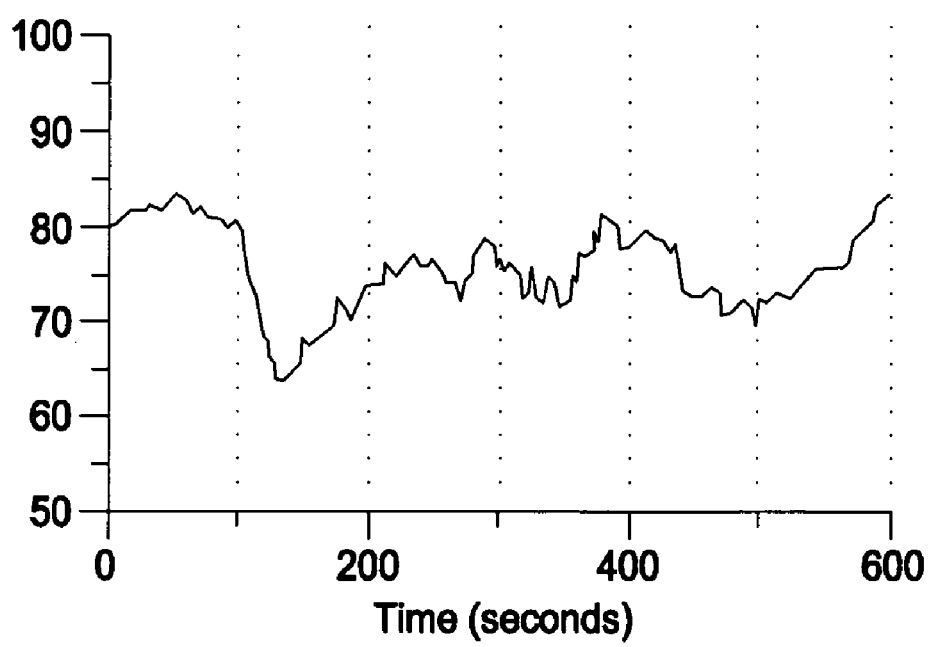
FIG. 6 is a graph illustrating an exemplary embodiment of a power output over time of the power generation system shown in FIG. 2.

FIG. 5 is a graph illustrating an exemplary embodiment of a power output over time of the wind farm 30 (shown in FIG. 2) without the alternate power source 32. FIG. 6 is a graph illustrating an exemplary embodiment of a power output over time of the power generation system 26 (shown in FIGS. 1 and 2) including the wind farm 30. FIG. 7 is a graph illustrating an exemplary embodiment of a power output over time of the power generation system 22 (shown in FIG. 1). FIG. 8 is a graph illustrating an exemplary embodiment of a power output over time of the power generation system 24 (shown in FIG. 1). Referring to FIG. 7, a first power output 72 represents the power output over time of the power generation system 22 when the power generation system 26 is not generating electrical power, a second power output 74 represents the power output over time of the system 22 when the wind farm 30 (shown in FIG. 2) is generating electrical power but the alternate power source 32 (shown in FIG. 2) is not, and a third power output 76 represents the power output over time of the system 22 when both the wind farm 30 and the alternate power source 32 are generating electrical power. Similarly, and referring to FIG. 8, a first power output 78 represents the power output over time of the power generation system 24 when the power generation system 26 is not generating electrical power, a second power output 80 represents the power output over time of the system 24 when the wind farm 30 is generating electrical power but the alternate power source 32 is not, and a third power output 82 represents the power output over time of the system 24 when both the wind farm 30 and the alternate power source 32 are generating electrical power. As can be seen form FIGS. 7 and 8, the second power outputs 74 and 80 vary more than the first and second power outputs 72 and 76. Such variation can facilitate wearing and possibly earlier failure of the systems 22 and/or 24. Furthermore, FIGS. 7 and 8 may also illustrate that at high levels of wind generation, when the wind farm 30 is operational but not the alternate power source 32, the systems 22 and/or 24 may have to operate at or near their operational limits. However, the third power outputs 76 and 82 illustrate that the power output of the systems 22 and 24 are each reduced by about half when both the wind farm 30 and the alternate power source 32 are generating electrical power. Accordingly, use of the system 26 may facilitate reducing a wear and/or a failure rate of the systems 22 and/or 24. Furthermore, use of the system 26 may facilitate reducing a cost of the generation of electrical power by supplementing the variable generation of electrical power of the wind farm 30, due to variable wind, with electrical power generated by the alternate power source 32 to thereby provide electrical power to geographic regions within the grid 20 and served by the system 26 without taxing other power generations systems within the grid 20. Moreover, the use of a mobile and/or possibly highly-efficient alternate power source 32 (such as, but not limited to, whether described herein, a simple-cycle gas turbine engine) may facilitate reducing a cost of electrical power generation, for example, by increasing a maneuverability of the alternate power source 32. As should be understood by one skilled in the art of electrical power generation, "maneuverability" may include a rate at which the alternate power source 32 becomes operational and/or changes a power output thereof.

FIG. 9 is a graph illustrating an exemplary embodiment of the delivery of electrical power from the power generation system 26 (shown in FIGS. 1 and 2). FIG. 10 is a graph illustrating an exemplary embodiment of the delivery of electrical power from the power generation system 22 (shown in FIG. 1) to the power generation system 24 (shown in FIG. 1). Referring to FIG. 9, a power input 84 illustrates the system 26 importing all of its local region power demand when the system 26 is not generating power, for example about 25 MW, while referring to FIG. 10 a first power input 86 illustrates a flow of, for example, about 200 MW from the system 22 to the system 24 when the system 26 is not generating power. Referring to FIG. 9, a first power output 88 of the system 26 illustrates the system 26 serving its own local region power demand and exporting excess power from the system 26 when the wind farm 30 (shown in FIG. 2) is generating electrical power but the alternate power source 32 (shown in FIG. 2) is not. The export varies with the wind. A second power output 90 of the system 26 also illustrates the system 26 serving its own local region power demand and exporting excess power, of for example about 75 MW from the system 26 when both the wind farm 30 and the alternate power source 32 are generating electrical power. Referring to FIG. 10, a second power input 92 illustrates a reduction, of about 100 MW for example, in the flow of power from the system 22 to the system 24 when both the wind farm 30 and the alternate power source 32 are generating electrical power. Accordingly, use of the system 26 may facilitate reducing a wear and/or a failure rate of the systems 22 and/or 24. Furthermore, use of the system 26 may facilitate reducing a cost of the generation of electrical power by supplementing the variable generation of electrical power of the wind farm 30, due to variable wind, with electrical power generated by the alternate power source 32 to thereby provide electrical power to geographic regions within the grid 20 and served by the system 26 without taxing other power generations systems within the grid 20. Moreover, the use of a mobile and/or possibly highly-efficient alternate power source 32 (such as, but not limited to, whether described herein, a simple-cycle gas turbine engine) may facilitate reducing a cost of electrical power generation, for example, by increasing a maneuverability of the alternate power source 32. As should be understood by one skilled in the art of electrical power generation, "maneuverability" may include a rate at which the alternate power source 32 becomes operational and/or changes a power output thereof.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, use of the term "portion" with respect to something is intended to some or all of the thing.

While the invention has been described in terms of various specific embodiments, those skilled in the art will recognize that the invention can be practiced with modification within the spirit and scope of the claims.

What is claimed is:

1. A power generation system comprising:
   a wind turbine generator for generating electrical power;
   an alternate power source; and
   a processor programmed to control operation of said alternate power source and said wind turbine generator to control a power output of at least one of said alternate power source and said wind turbine generator at least partially based on a wind density measured by a wind density sensor.

2. A power generation system in accordance with claim 1 wherein the power output of said alternate power source comprises an amount of electrical power generated by said alternate power source, a frequency of electrical power generated by said alternate power source, and a rate of change of at least one of the amount and frequency of electrical power generated by said alternate power source.

3. A power generation system in accordance with claim 1 wherein said alternate power source comprises at least one of a simple-cycle gas turbine engine for generating rotational energy from combustion gases and a mobile power source.

4. A power generation system in accordance with claim 3 wherein said alternate power source comprises said gas turbine engine, and said system further comprises an electrical generator operatively connected to said gas turbine engine for generating electrical power from the rotational energy generated by said gas turbine engine.

5. A power generation system in accordance with claim 3 wherein said alternate power source comprises said gas turbine engine and said gas turbine engine has an efficiency of one of equal to and greater than about 35 percent at an operational load of at least about 50 percent.

6. A power generation system in accordance with claim 3 wherein said alternate power source comprises said gas turbine engine and said gas turbine engine does not emit sound greater than about 100 dBA at a distance of at least three feet.

7. A power generation system in accordance with claim 3 wherein said alternate power source comprises said gas turbine engine and said gas turbine engine emits NOx of no more than about 35 parts per million.

8. A power generation system in accordance with claim 1 wherein said processor is programmed to control a total power output of said wind turbine generator and said alternate power source by controlling the power output of at least one of said alternate power source and said wind turbine generator.

9. A power generation system in accordance with claim 8 wherein said processor is programmed to control the total power output of said wind turbine generator and said power source within a predetermined range.

10. A power generation system in accordance with claim 1 wherein the power output of said wind turbine generator comprises at least one of an amount of power generated by said wind turbine generator, a frequency of power generated by said wind turbine generator, a rate of change of at least one of the frequency and the amount of power generated by said wind turbine generator, and a potential amount of power generated by said wind turbine generator.

11. A power generation system in accordance with claim 1 wherein said processor is programmed to control operation of said wind turbine generator to control a power output of said wind turbine generator.

12. A power generation system in accordance with claim 1 further comprising a wind parameter sensor for measuring a wind parameter, said wind parameter sensor operatively connected to said processor for transmitting a signal representing a measured wind parameter to said processor.

13. A power generation system in accordance with claim 12 wherein the measured wind parameter comprises at least one of the wind density and a wind speed.

14. A method of generating electrical power, said method comprising:
   generating electrical power using a wind farm;
   generating electrical power using an alternate power source; and
   controlling operation of the alternate power source and said wind turbine generator to control a power output of at least one of the alternate power source and said wind turbine generator at least partially based on a wind density measured by a wind density sensor.

15. A method in accordance with claim 14 wherein said controlling operation of the alternate power source comprises controlling a total power output of the wind farm and the alternate power source by controlling the power output of at least one of the alternate power source and the wind farm.

16. A method in accordance with claim 15 wherein said controlling the total power output of the wind farm and the alternate power source comprises controlling the total power output of the wind farm and the alternate power source within a predetermined range.

17. A method in accordance with claim 14 wherein said controlling operation of the alternate power source to control a power output of the alternate power source comprises controlling at least one of an amount of electrical power generated by the alternate power source, a frequency of electrical power generated by the alternate power source, and a rate of change of at least one of the amount and the frequency of electrical power generated by the alternate power source.

18. A method in accordance with claim 14 wherein said controlling operation of the alternate power source comprises controlling operation of the power source at least partially based on the power output of the wind farm, wherein the power output of the wind farm comprises at least one of an amount of electrical power generated by the wind farm, a frequency of electrical power generated by the wind farm, a rate of change of at least one of the frequency and the amount of electrical power generated by the wind farm, and a potential amount of power generated by the wind farm.

19. A method in accordance with claim 14 further comprising controlling operation of the wind farm to control a power output of the wind farm.

20. A processor for controlling operation of a power generation system including a wind farm and an alternate power source, said processor programmed to control operation of the alternate power source and a wind turbine generator to control a power output of at least one of the alternate power source and the wind turbine generator at least partially based on a wind density measured by a wind density sensor.

21. A processor in accordance with claim 20 further programmed to control a total power output of the alternate power source and the wind farm by controlling the power output of at least one of the alternate power source and the wind farm.

22. A processor in accordance with claim 21 further programmed to control the total power output of the alternate power source and the wind farm within a predetermined range.

23. A processor in accordance with claim 20 wherein the power output of the wind farm comprises at least one of an amount of electrical power generated by the wind farm, a frequency of electrical power generated by the wind farm, a rate of change of at least one of the amount and the frequency of electrical power generated by the wind farm, and a potential amount of electrical power generated by the wind farm.

24. A processor in accordance with claim 20 further programmed to control at least one of an amount of electrical power generated by the alternate power source, a frequency of electrical power generated by the alternate power source, and a rate of change of at least one of the amount and the frequency of electrical power generated by the alternate power source.

25. A processor in accordance with claim 20 further programmed to control operation of the wind farm to control a power output of the wind farm.

26. A power generation system comprising:
   a wind turbine generator for generating electrical power;
   a gas turbine; and
   a processor programmed to control operation of said gas turbine and said wind turbine generator to control a power output of at least one of said gas turbine and said wind turbine generator at least partially based on a wind density measured by a wind density sensor.

* * * * *